ively of a truck
UNITED STATES PATENT OFFICE.

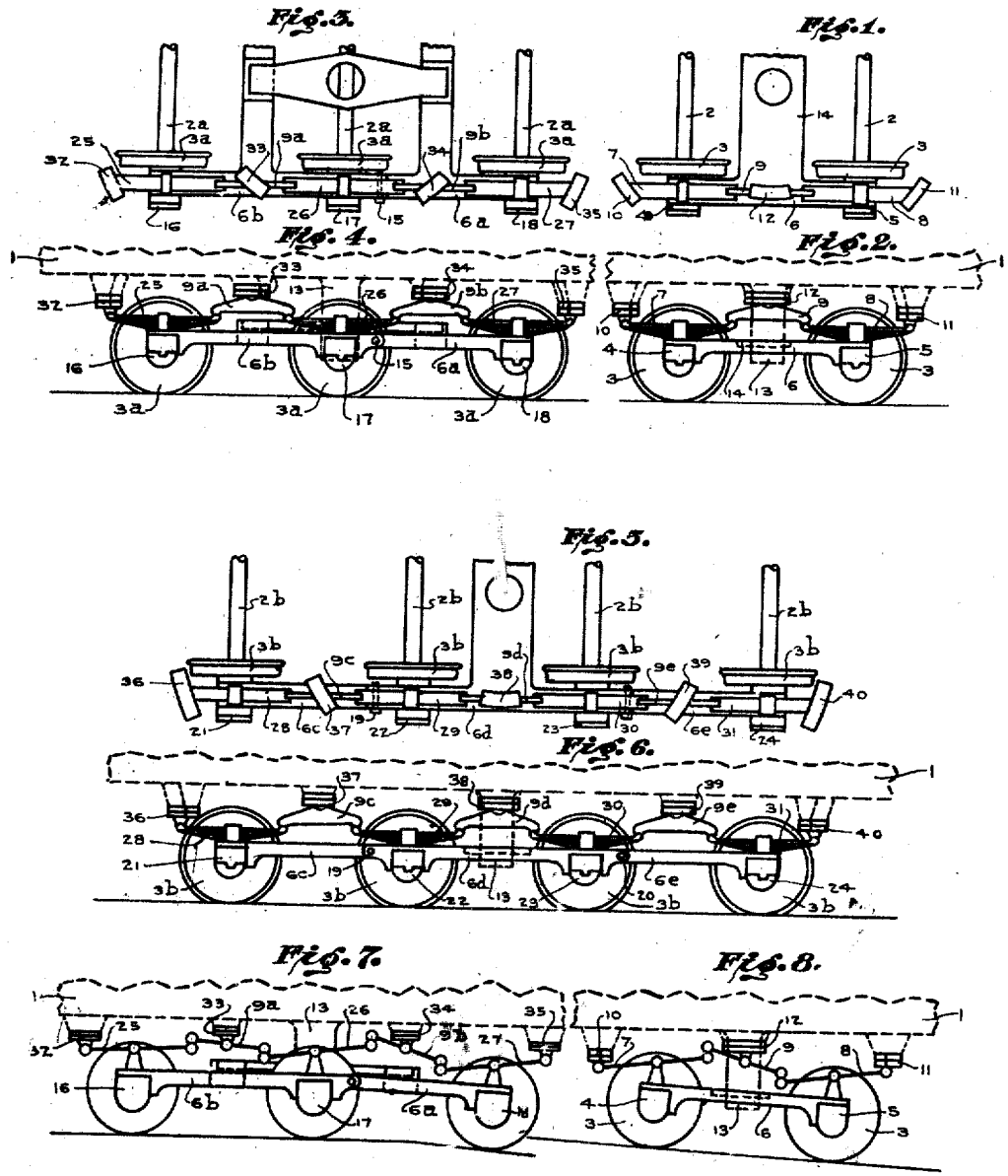

JOHN A. PILCHER, OF ROANOKE, VIRGINIA.

SYSTEM OF EQUALIZATION FOR CAR-TRUCKS.

1,265,374.  Specification of Letters Patent.  Patented May 7, 1918.

Application filed August 2, 1916. Serial No. 112,763.

*To all whom it may concern:*

Be it known that I, JOHN A. PILCHER, a citizen of the United States, residing at Roanoke, in the county of Roanoke and State of Virginia, have invented certain new and useful Improvements in Systems of Equalization for Car-Trucks, of which the following is a specification.

This invention pertains to means for equalizing the loads applied to car trucks among the wheels thereof and is particularly applicable to trucks used for railway cars or the like. The invention consists in the novel features of construction and the arrangement and combination of parts as will be herein described and particularly claimed.

In the accompanying drawings, Figure 1 is a broken plan view of a car truck of the four-wheel type and Fig. 2 a side elevational view of the same, this truck being constructed in accordance with the present invention. Figs. 3 and 4 are similar views respectively of a truck of the six-wheel type and Figs. 5 and 6 similar views respectively of a truck of the eight-wheel type, each embodying the feature of this invention. Figs. 7 and 8 are diagrammatic views of six and four wheel trucks respectively, showing the action of the equalizer system when one of the truck axles is lowered below the normal plane of the axles.

It is to be understood at the outset that my invention is applicable to any type of car truck employing a multiplicity of wheels and axles.

Referring to these drawings, I have indicated a portion of a car body 1 as supported by each of these trucks and the body is in each instance supported thereon at a plurality of points spaced one from the other longitudinally of the car. The four-wheel type of truck being the simplest construction shown, it will be described first and the modifications necessary for additional wheels will then be described.

Referring to Figs. 1 and 2, this truck consists of two axles 2—2 with wheels 3—3 mounted thereon in the customary manner. These axles are spaced one from the other longitudinally of the truck and the ends of the axles are journaled in the customary oil boxes 4 and 5. The oil boxes at each side of the truck are rigidly secured to a longitudinally extending bar 6 which ties these boxes together and holds them in spaced relationship one with the other. The boxes 4 and 5 being rigidly secured to these bars 6 have no vertical movement with respect to the same, but the oil boxes 4 or 5 may move vertically with respect to each other as when a low joint is encountered in the rail, by the harmonious movement of the attached end of the side bar 6, a slight pivotal movement occurring around the opposite axle as a center. This action is clearly shown in Fig. 8.

The equalizers used in connection with this rigid oil box truck consist of a longitudinally disposed lever for each oil box and a similarly disposed intermediate lever between the two. Thus there are provided oil box levers 7 and 8 for the oil boxes 4 and 5 respectively and supported by any approved means upon the inner ends of these levers is the intermediate lever 9. The load from the car body may be applied directly to these levers as shown, but in any event load is applied at the outer ends of the levers for the end oil boxes as at 10 and 11 and at the center of each intermediate lever as at 12. In the present embodiment suitable swiveling load seats are provided on the car body to coöperate with those on the truck at 10, 11 and 12 and the levers and seats are shown with proper bearings of pivotal construction. This form has been depicted as a practical one but many other methods of applying the load to the equalizer system might be employed. The truck may also be properly retained beneath the car by any suitable means, a depending trunnion 13 being shown from the car body with a plate 14 extending from one side bar 6 of the truck to the other, this plate serving to hold the side bars in position and alinement and to center the truck through coöperation with the trunnion 13. While the truck is shown for swiveling under the car body, the system of equalization may be employed with non-swiveling trucks.

The oil box levers may be made of halfelliptic springs so as to utilize these members for yieldably supporting the car upon the trucks and should be made with the customary rounded bearings over the oil boxes so that the said levers may readily respond to track irregularities. Thus the lever system includes a lever disposed over each oil box and supported thereby between the extremities of the said oil box lever, and an intermediate lever disposed between each two adjacent oil box levers, the ends of the intermediate levers being supported upon the adjacent ends of the oil box levers. And each intermediate lever receives load between its extremities and delivers it to the oil box levers and the outer ends of the two end oil box levers also receive loads and deliver the same to the oil boxes. Thus this system of equalization may be extended to accommodate trucks with any number of pairs of wheels, it being a portion of the present invention to provide a jointed side bar construction for trucks having more than two pairs of wheels so that this equalizer system may be used therewith. For in all instances I make the oil boxes rigid with or a part of the side bars and depend upon the movement of side bar and oil box together to permit the wheels to follow irregularities in the track. Thus in the six wheel truck shown in Figs. 3 and 4, which is provided with similar wheels $3^a$ and axles $2^a$, I provide a jointed side bar, the joint 15 allowing the portion $6^a$ of this side bar to move vertically relative to the portion $6^b$. The oil boxes 16 and 17 being secured to the portion $6^b$, this part acts the same as the four wheel truck just described in so far as the drop of one pair of wheels is concerned. The box 18 only being secured to the portion $6^a$ of this bar it will be seen that the box 18 may move freely vertically with respect to the boxes 16 and 17. Fig. 7 shows the position of the equalizers, side bar, oil boxes, etc., when an end pair of wheels drops below the normal plane.

And for the eight wheel type of truck shown in Figs. 5 and 6, which is supplied with axles $2^b$ and wheels $3^b$, the side bar is jointed at 19 and at 20 so that it is divided into 3 portions, $6^c$, $6^d$ and $6^e$. The oil box 21 is secured to the portion $6^c$, the oil boxes 22 and 23 to the portion $6^d$, and the oil box 24 to the portion $6^e$. Thus any pair of wheels may drop relative to any other pair but in all instances the corresponding oil boxes must move harmoniously with the attached end of the side bar. In the drawings but one side of a truck is shown, but it will be understood that in each instance a similar series of wheels, oil boxes and side bars are provided for the opposite side of the truck. Similar load transferring seats, 32, 33, 34, 35, 36, 37, 38, 39 and 40 and similar centering means are shown for the six and eight wheel type of trucks as already described for the four wheel type. This form of construction is not imperative, however, as any suitable means may be employed for applying the load to the equalizers and for retaining the trucks beneath the car.

It will now be seen that in all instances an intermediate lever 9, $9^a$, $9^b$, $9^c$, $9^d$, $9^e$ is supplied between each pair of oil box levers, the ends of the former being supported by the adjacent ends of the latter. And each intermediate lever receives load between its extremities and delivers it to the oil box levers. And the outer ends of the oil box levers for the end axles, where there are no intermediate levers, receive loads independently of the intermediate lever. The oil box levers (7, 8, 25, 26, 27, 28, 29, 30 and 31) are placed preferably on top of the side bars and on line with the oil box centers so as to deliver their loads directly thereto without inducing bending in the side bars, the bars acting merely as means for spacing the oil boxes and holding them in alinement. Any irregularity in wheel loadings will be transferred throughout the system of longitudinally disposed equalizers and will be corrected so that each wheel will carry its correct load. And the spaced load seats will each be called upon to deliver a predetermined load because of the back-equalizing effects. For example, if by error one seat should be made out of its correct relationship with the others it would have no noticeable effect upon the equalization, for the levers would all assume angular positions at which all the seats would react. The advantages of this construction will be evident.

I am aware that similar results have been obtained in connection with trucks of the pedestal type, that is, where the oil boxes have vertical movement relative to the side bars, but in my invention I secure these results in trucks of the rigid box type.

What I claim is:

1. In a system of equalization for car trucks, a plurality of wheels and axles, spaced longitudinally of the truck with respect to each other and with oil boxes mounted on the said axles, a bar extending longitudinally of the truck and connecting the oil boxes one with the other and spacing the same, the said boxes being rigidly secured to the said bar and not being capable of relative vertical movement with respect thereto, the said oil boxes being capable of vertical movement with respect to each other only through the harmonious movement of the attached portions of the said bar, and in combination therewith a system of equalizing members separate from the said bar and extending longitudinally of the truck and above the same and adapted to receive loads from the car body and distribute and equalize them directly among the oil boxes, the said lever system including a lever mounted adjacent each axle and having pivotal movement with respect to the said bar, the said levers being fulcrumed at their centers immediately in line with the oil boxes and supported thereby, and there being means in connection with said equalizer system for receiving car body loads and imparting the same to the said levers and equalizing them thereamong.

2. In a system of equalization for car trucks, a plurality of wheels and axles, spaced longitudinally of the truck with respect to each other and with oil boxes mounted on the said axles, a bar extending longitudinally of the truck and connecting the oil boxes one with the other and spacing the same, the said boxes being rigidly secured to the said bar and not being capable of relative vertical movement with respect thereto, the said oil boxes being capable of vertical movement with respect to each other only through the harmonious movement of the attached portions of the said bar, and in combination therewith, a system of equalizing members separate from the said bar and extending longitudinally of the truck and adapted to receive loads from the car body and distribute and equalize them directly among the oil boxes, the said lever system including a lever mounted adjacent each axle and having pivotal movement with respect to the said bar, the said levers being fulcrumed at their center upon the said bar and immediately over the oil boxes, and there being means in connection with said equalizer system for receiving car body loads and imparting the same to the said levers and equalizing them thereamong.

3. In a system of equalization for car trucks, a plurality of wheels and axles spaced longitudinally of the truck with respect to each other and with oil boxes mounted on the said axles, a bar extending longitudinally of the truck and connecting the oil boxes one with another, the boxes being rigidly secured to the said bar and the boxes being capable of relative vertical movement independently of each other, but dependent upon harmonious movement of the attached portions of the said bar, a system of levers separate from the said bar and arranged longitudinally of the truck and adjacent the said oil boxes and arranged to receive load from the car body at a plurality of points spaced one from the other longitudinally of the truck, said system of levers embodying levers supported at their centers by each oil box and an intermediate lever supported at its ends upon the adjacent ends of the oil box levers, there being one of the said load receiving points near the center of each intermediate lever and one at the outer extremity of each end oil box lever.

4. In a car truck equalizing system, a plurality of wheels and axles spaced longitudinally of the truck with respect to each other and with oil boxes mounted on the said axles, side bars to which are rigidly attached the said oil boxes, the said oil boxes being capable of relative vertical movement independently of each other but dependent upon harmonious movement of the attached portions of the side bars, a car body supported by the said truck at a plurality of points removed longitudinally of the car from each other, a system of levers separate from the said bars along each side of the truck having seats thereon formed to receive the load from the car body and being arranged to distribute it among the oil boxes, said lever system including oil box levers and intermediate levers, the end oil box levers having load receiving seats at their outer extremities and being supported between their extremities by the end oil boxes respectively, the inner extremities of the oil box levers being provided with means for transferring of loads thereto from the outer extremities of the intermediate levers and there being load receiving seats on the intermediate levers between the extremities thereof.

5. In a car truck equalizing system, a plurality of wheels and axles spaced longitudinally of the truck with respect to each other and mounted on the said axles, side bars to which are rigidly attached the said oil boxes, the said oil boxes being capable of relative vertical movement independently of each other but dependent upon harmonious movement of the attached portions of the side bars, a car body supported by the said truck at a plurality of points removed longitudinally of the car from each other, a system of levers separate from the said bars along each side of the truck having seats thereon to receive the load from the car body and being arranged to distribute it among the truck wheels, said lever system including an oil box lever and an intermediate lever, the said oil box lever having one of the said load receiving seats at its outer extremity and being supported between its extremities by an end oil box, the said intermediate lever having a second of the said load receiving seats between its extremities, the one end of the said intermediate lever being supported upon the inner extremity of the said oil box lever and the other end thereof being provided with supporting means arranged to transfer its load to another oil box.

6. In a car truck equalizing system, a plurality of wheels and axles spaced longitudinally of the truck with respect to each other and with oil boxes mounted on the said axles, jointed side bars which are flexible for relative vertical movement and to which are rigidly attached the said oil boxes, a car body supported by the said truck at a plurality of points removed longitudinally of the car from each other, a system of levers separate from the side bars along each side of the truck having seats thereon formed to receive the load from the car body and being arranged to distribute it among the oil boxes, said lever system including an oil box lever and an intermediate lever, the said oil box lever having one of the said load receiving seats at its outer extremity and being supported between its extremities by an end oil box, the said intermediate lever having a second of the said load receiving seats between its extremities, the one end of the said intermediate lever being supported upon the inner extremity of the said oil box lever and the other end thereof being provided with supporting means arranged to transfer its load to another oil box.

7. In a car truck, a plurality of wheels and axles spaced longitudinally of the truck with respect to each other and with oil boxes mounted on the said axles, side bars to which are rigidly attached the said oil boxes, the said oil boxes being capable of relative vertical movement independently of each other but dependent upon harmonious movement of the attached portions of the side bars, a car body supported by the said truck at a plurality of points removed longitudinally of the car from each other, a system of levers separate from the side bars along each side of the truck having seats thereon formed to receive the load from the car body and being arranged to distribute it among the oil boxes, said lever system including oil box levers and intermediate levers, the oil box levers bearing at their central portions upon the said side bars, each immediately over an oil box, the end oil box levers having load receiving seats at their outer extremities and the inner extremities of the same being provided with means for transferring loads thereto from the outer extremities of the intermediate levers and there being load receiving seats on the intermediate levers between the extremities thereof.

In testimony whereof I affix my signature in presence of a witness.

JOHN A. PILCHER.

Witness:
  A. K. SIMMONS.